(12) United States Patent
Sasaki et al.

(10) Patent No.: US 7,206,021 B2
(45) Date of Patent: Apr. 17, 2007

(54) HYBRID PIXEL INTERPOLATING APPARATUS AND HYBRID PIXEL INTERPOLATING METHOD

(75) Inventors: Gen Sasaki, Osaka (JP); Takashi Matsutani, Osaka (JP)

(73) Assignee: Mega Chips Corporation, Osaka-shi (JP)

( * ) Notice: Subject to any disclaimer, the term of this patent is extended or adjusted under 35 U.S.C. 154(b) by 835 days.

(21) Appl. No.: 10/364,381

(22) Filed: Feb. 12, 2003

(65) Prior Publication Data

US 2003/0156205 A1  Aug. 21, 2003

(30) Foreign Application Priority Data

Feb. 21, 2002  (JP)  ............... 2002-044903

(51) Int. Cl.
*H04N 3/14* (2006.01)
*H04N 5/228* (2006.01)
*H04N 1/46* (2006.01)
*G06K 9/32* (2006.01)

(52) U.S. Cl. .................. 348/277; 348/222.1; 382/300; 358/525

(58) Field of Classification Search ...................... None
See application file for complete search history.

(56) References Cited

U.S. PATENT DOCUMENTS

| | | | | |
|---|---|---|---|---|
| 5,396,441 A | * | 3/1995 | Ozawa | .............. 348/242 |
| 5,552,827 A | * | 9/1996 | Maenaka et al. | .............. 348/266 |
| 5,581,298 A | * | 12/1996 | Sasaki et al. | .............. 348/222.1 |
| 5,652,621 A | * | 7/1997 | Adams et al. | .............. 348/272 |
| 5,771,074 A | * | 6/1998 | Ibenthal | .............. 348/444 |
| 6,714,242 B1 | * | 3/2004 | Kobayashi | .............. 348/273 |
| 6,744,916 B1 | * | 6/2004 | Takahashi | .............. 348/222.1 |
| 6,816,197 B2 | * | 11/2004 | Keshet et al. | .............. 348/280 |
| 6,882,365 B1 | * | 4/2005 | Aoki | .............. 382/300 |
| 2003/0160875 A1 | * | 8/2003 | Mitsunaga et al. | .............. 358/525 |

FOREIGN PATENT DOCUMENTS

| | | |
|---|---|---|
| JP | 2000-069492 | 3/2000 |
| JP | 2001-148793 | 5/2001 |
| JP | 2001-258040 | 9/2001 |

\* cited by examiner

*Primary Examiner*—Lin Ye
*Assistant Examiner*—Nhan Tran
(74) *Attorney, Agent, or Firm*—Oblon, Spivak, McClelland, Maier & Neustadt, P.C.

(57) ABSTRACT

A hybrid pixel interpolating apparatus (1) has a function of converting raw image data (D1) having one color component for each pixel into pixel interpolated data in which each pixel has a plurality of color components. This hybrid pixel interpolating apparatus (1) includes: a register (2) for holding pixel data in a predetermined pixel region in the raw image data (D1) to be inputted; a plurality of pixel interpolating parts ($4_1, 4_2, \ldots, 4_{n-1}, 4_n$ (n: integer not less than 2)) for sampling pixel data (D2) inputted from the register (2) to execute a pixel interpolating process; and a mixing coefficient calculating part (3) for calculating mixing coefficients ($\alpha_1, \alpha_2, \ldots, \alpha_n$), and also includes a mixing part (5) for fetching and mixing interpolated data ($DI_1, DI_2, \ldots, DI_n$) outputted from the respective pixel interpolating parts ($4_1$ to $4_n$) to output the resultant. In the mixing coefficient calculating part (3), the mixing coefficients ($\alpha_1$ to $\alpha_n$) are calculated for each of the pixel interpolating parts ($4_1$ to $4_n$) so as to suppress the deterioration in image quality at minimum.

28 Claims, 6 Drawing Sheets

HYBRID PIXEL INTERPOLATING APPARATUS AND HYBRID PIXEL INTERPOLATING METHOD

BACKGROUND OF THE INVENTION

1. Field of the Invention

The present invention relates to a pixel interpolating apparatus and pixel interpolating method for interpolating color components lacking in a pixel for image data having only one color component for each pixel.

2. Description of the Background Art

In a digital camera, incident light from a subject is focused after passing through an optical system such as lens, an optical filter and the like, and detected at an image pickup sensor such as CCD sensor or CMOS sensor and subjected to photoelectric conversion to be finally outputted as raw image data. In general, incident light entered into an image pickup sensor passes through a color filter array where each pixel is colored prior to being subjected to photoelectric conversion. The color filter array generally includes color filters of three primary colors of R (red), G (green) and B (blue) or of complementary colors such as Y (yellow), M (magenta), G (green), C (cyan) and the like which are arranged in accordance with a predetermined rule. In the case of a single-plate image pickup sensor with a color filter array, only one color filter of one color is formed for each pixel, so that the image pickup sensor outputs raw image data where each pixel has only one color component. Since that raw image data cannot be displayed on a display monitor as it is, it is necessary to perform a pixel interpolation process for interpolating color components lacking in each pixel in the raw image data while referring to color components of surrounding pixels.

Figure 7:
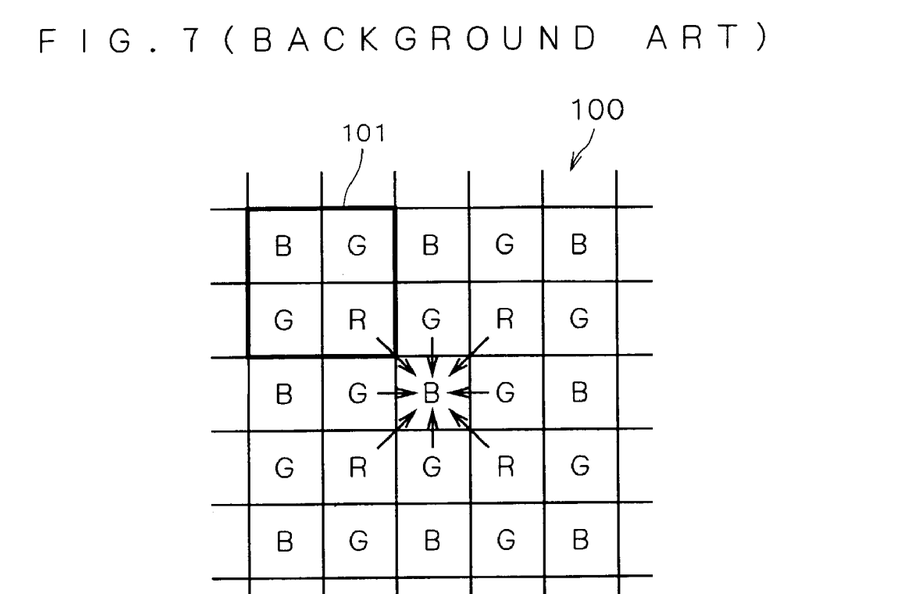
FIG. 7 is a schematic view showing an example of raw image data wherein three primary color components of R, G and B are arranged in matrix.
Figure 8:
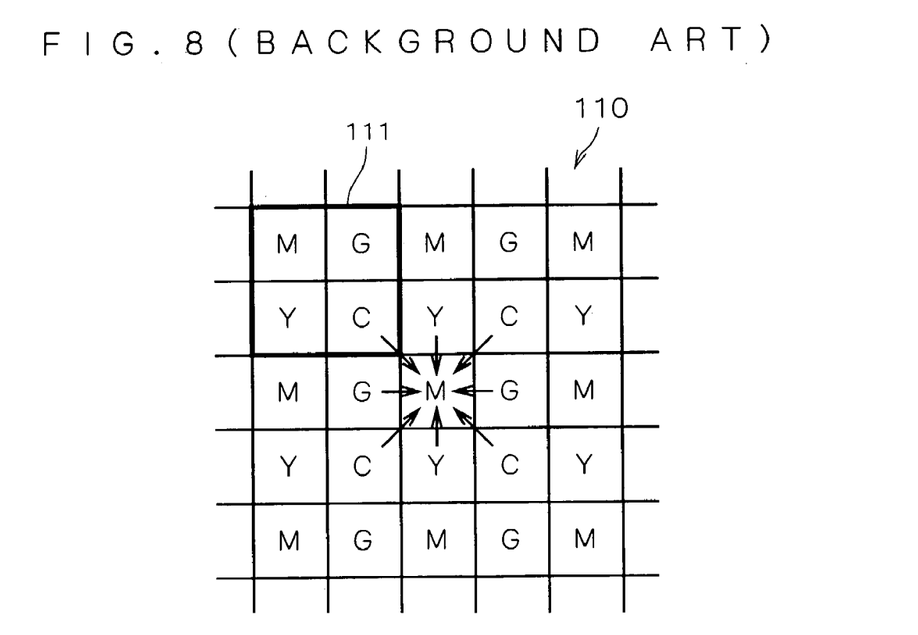
FIG. 8 is schematic view showing an example of raw image data wherein complementary color components of Y, M, G and C are arranged in matrix.

FIGS. 7 and 8 are schematic views showing examples of raw image data 100 and 110 wherein each color component is arrayed in matrix in conformance with the color filter array. FIG. 7 shows the raw image data 100 which is obtained by picking up transmitted light of a color filter array of three primary color system wherein each pixel corresponds to either one of color components of R, G and B in one-to-one correspondence. A color component array of 2×2 pixel region defined by the bold frame 101 is a basic array. On the other hand, FIG. 8 shows the raw image data 110 which is obtained by picking up transmitted light of a color filter array of complementary color system wherein each pixel corresponds to either one of color components of Y, M, G and C in one-to-one correspondence. A color component array of 2×2 pixel region defined by the bold frame 111 is a basic array.

In a pixel interpolation process, as shown in FIG. 7, for example, with respect to a current pixel at the center having only a B component, four R components and four G components in surrounding pixels are referred. Then an R component and a G component that are lacking in the current pixel are interpolated by, for example, averaging the referred color components for every color. Also the same applies to the raw image data 110 of complementary color system. As shown in FIG. 8, for example, with respect to the current pixel having only an M component, the lacking C component, G component and Y component are interpolated by referring to four C components, two G components and two Y components in the surrounding pixels. Not limited to the pixel interpolation method as described above, a variety of pixel interpolating methods are known.

However, since color components are generated while referring to surrounding pixels in the neighborhood of the current pixel, a false color that does not originally exist may occur, as well as image deterioration such as enhancement of noise components may occur. It is known that particularly in an image region of metallic material or in an image region that includes a plenty of color edges and where deviation in color is large, a false color is likely to occur. In addition, since the interpolation is performed while averaging the surrounding pixels for every color, high-frequency components representing fine patterns are liable to be removed.

It is also known that since each pixel on the image pickup sensor is regularly arranged as shown in FIGS. 7 and 8, when a fine stripe pattern or a grid pattern is picked up, surrounding pixels in the neighborhood of the current pixel interfere with each other due to the pixel interpolation process, to cause an occurrence of moiré (interference fringe).

Therefore, in order to avoid the deterioration in image quality as described above, an adaptive pixel interpolation process which detects an image pattern in the vicinity of the current pixel and changes the interpolating method in conformance with the image pattern thus detected may be performed, however, even with such a measure, complete avoidance of the above-mentioned deterioration in image quality has not realized yet. An additional problem associated with changing the interpolating method for every pixel is that a local discontinuity occurs, which may rather deteriorate the image quality.

SUMMARY OF THE INVENTION

It is an object of the present invention to provide a hybrid pixel interpolating apparatus and hybrid pixel interpolating method capable of significantly improving the deterioration in image quality associated with a pixel interpolation process.

According to a first aspect of the present invention, a hybrid pixel interpolating apparatus converts raw image data having only one color component for each pixel into pixel interpolated data having a plurality of color components for each pixel, and includes a plurality of pixel interpolating parts, a mixing coefficient calculating part and a mixing part. The plurality of pixel interpolating parts interpolates color components lacking in a current pixel in different manners using color components in surrounding pixels of the current pixel in the raw image data. The mixing coefficient calculating part calculates mixing coefficients assigned to each of the pixel interpolating parts using the color components in a local region in the vicinity of the current pixel in the raw image data. The mixing part generates the pixel interpolated data by mixing interpolated data inputted from the plurality of pixel interpolating parts for each pixel in accordance with the mixing coefficients.

According to a second aspect of the present invention, in the hybrid pixel interpolating apparatus according to the first aspect, the mixing coefficient calculating part has a circuit for calculating each of the mixing coefficients on the basis of a signal level of the current pixel.

According to a third aspect of the present invention, in the hybrid pixel interpolating apparatus according to the second aspect, the mixing coefficient calculating part has a converting circuit for converting the signal level of the current pixel in accordance with a predetermined conversion table, and calculates each of the mixing coefficients on the basis of a value converted at the converting circuit.

According to a fourth aspect of the present invention, in the hybrid pixel interpolating apparatus according to any of first to third aspects, the mixing coefficient calculating part has a circuit for calculating each of the mixing coefficients on the basis of a statistical value regarding the color component in the local region.

According to a fifth aspect of the present invention, in the hybrid pixel interpolating apparatus according to the fourth aspect, the statistical value is a sum total or an average value of brightness values for each color in the local region.

According to a sixth aspect of the present invention, in the hybrid pixel interpolating apparatus according to the fourth aspect, the statistical value is a standard deviation or a variance for each color of the color components in the local region.

According to a seventh aspect of the present invention, in the hybrid pixel interpolating apparatus according to the fourth to sixth aspects, the mixing coefficient calculating part has a circuit for calculating a degree of deviation in color of the local region by using the statistical values, and calculating the mixing coefficients in accordance with the degree of deviation.

According to an eighth aspect of the present invention, in the hybrid pixel interpolating apparatus according to the seventh aspect, the degree of deviation is a ratio between the statistical values of different colors.

According to a ninth aspect of the present invention, in the hybrid pixel interpolating apparatus according to the eighth aspect, the ratio is a ratio between maximum value and minimum value in the statistic values.

According to a tenth aspect of the present invention, in the hybrid pixel interpolating apparatus according to the seventh aspect, the degree of deviation is a difference between the statistical values of different colors.

According to an eleventh aspect of the present invention, in the hybrid pixel interpolating apparatus according to any of the fourth to tenth aspects, the mixing coefficient calculating part has a converting circuit for converting the statistical value or the value of degree of deviation in accordance with a predetermined conversion table, and calculates each of the mixing coefficients on the basis of a value converted at the converting circuit.

According to a twelfth aspect of the present invention, in the hybrid pixel interpolating apparatus according to any of the first to eleventh aspects, the mixing coefficient calculating part has a circuit for interchanging the mixing coefficients in accordance with an externally inputted control signal.

According to a thirteenth aspect of the present invention, in the hybrid pixel interpolating apparatus according to any of the first to twelfth aspects, at least one pixel interpolating part among the plurality of pixel interpolating parts has: a circuit for calculating ratios for each color between an average value or a sum total of color components which have the same color of the current pixel in the local region and an average value or a sum total of color components lacking in the current pixel; and a circuit for generating the lacking color components by multiplying the color component of the current pixel by the ratios.

According to a fourteenth aspect of the present invention, in the hybrid pixel interpolating apparatus according to any of the first to thirteenth aspects, the raw image data results from picking up by a single-plate image pickup device mounted on a digital camera.

According to a fifteenth aspect of the present invention, A hybrid pixel interpolating method which converts raw image data having only one color component for each pixel into pixel interpolated data having a plurality of color components for each pixel, includes the steps of: (a) interpolating color components lacking at a current pixel by a plurality of pixel interpolating processes each of which is different from each other using color components in surrounding pixels of the current pixel in the raw image data; (b) calculating mixing coefficients assigned to each of the pixel interpolating processes using the color components in a local region in the vicinity of the current pixel in the raw image data; and (c) generating the pixel interpolated data by mixing interpolated data interpolated in each of the pixel interpolating processes in the step (a) for each pixel in accordance with the mixing coefficients.

According to a sixteenth aspect of the present invention, in the hybrid pixel interpolating method according to the fifteenth aspect, the step (b) includes a step of calculating each of the mixing coefficients on the basis of a signal level of the current pixel.

According to a seventeenth aspect of the present invention, in the hybrid pixel interpolating method according to the sixteenth aspect, the step (b) has a converting step of converting a signal level of the current pixel in accordance with a predetermined conversion table, and includes a step of calculating each of the mixing coefficients on the basis of a value converted in the converting step.

According to an eighteenth aspect of the present invention, in the hybrid pixel interpolating method according to any of the fifteenth to seventeenth aspects, the step (b) includes a step of calculating each of the mixing coefficients on the basis of a statistical value regarding the color component in the local region.

According to a nineteenth aspect of the present invention, in the hybrid pixel interpolating method according to the eighteenth aspect, the statistical value is a sum total or an average value of brightness values for each color in the local region.

According to a twentieth aspect of the present invention, in the hybrid pixel interpolating method according to the eighteenth aspect, the statistical value is a standard deviation or a variance for each color of the color components in the local region.

According to a twenty-first aspect of the present invention, in the hybrid pixel interpolating method according to any of the eighteenth to twentieth aspects, the step (b) includes a step of calculating a degree of deviation in color of the local region by using the statistical values, and calculating each of the mixing coefficients in accordance with the degree of deviation.

According to a twenty-second aspect of the present invention, in the hybrid pixel interpolating method according to the twenty-first aspect, the degree of deviation is a ratio between the statistical values of different colors.

According to a twenty-third aspect of the present invention, in the hybrid pixel interpolating method according to the twenty-second aspect, the ratio is a ratio between maximum value and minimum value in the statistic values.

According to a twenty-fourth aspect of the present invention, in the hybrid pixel interpolating method according to the twenty-first aspect, the degree of deviation is a difference between the statistical values of different colors.

According to a twenty-fifth aspect of the present invention, in the hybrid pixel interpolating method according to any of the eighteenth to twenty-fourth aspects, the step (b) includes a converting step of converting the statistical value or the value of degree of deviation in accordance with a predetermined conversion table, and a step of calculating each of the mixing coefficients on the basis of a value converted in the converting step.

According to a twenty-sixth aspect of the present invention, the hybrid pixel interpolating method according to any of the eighteenth to twenty-fifth aspects further includes the step of: (d) interchanging the mixing coefficients calculated in the step (b) in accordance with an externally inputted control signal.

According to a twenty-seventh aspect of the present invention, in the hybrid pixel interpolating method according to any of the fifteenth to twenty-sixth aspects, at least one pixel interpolating process among the plural pixel interpolating processes in the step (a) has: (a-1) a process of calculating ratios for each color between an average value or a sum total of color components which have the same color of the current pixel in the local region and an average value or a sum total of color components lacking in the current pixel; and (a-2) a process of generating the lacking color components by multiplying the color component of the current pixel by the ratios calculated in the process (a-1).

According to a twenty-eighth aspect of the present invention, in the hybrid pixel interpolating method according to any of the fifteenth to twenty-seventh aspects, the raw image data results from picking up by a single-plate image pickup device mounted on a digital camera.

As described above, according to the hybrid pixel interpolating apparatus and the hybrid pixel interpolating method of the present invention, since interpolated data outputted from each pixel interpolating parts is mixed in ratio of mixing coefficients calculated by the mixing coefficient calculating part, it is possible to execute an optimum pixel interpolating process in accordance with characteristics of image in the local region, and to obtain pixel interpolated data having excellent image quality by suppressing the deterioration in image quality.

These and other objects, features, aspects and advantages of the present invention will become more apparent from the following detailed description of the present invention when taken in conjunction with the accompanying drawings.

DESCRIPTION OF THE PREFERRED EMBODIMENTS

Various preferred embodiments according to the present invention will now be described.

First Preferred Embodiment

Figure 1:
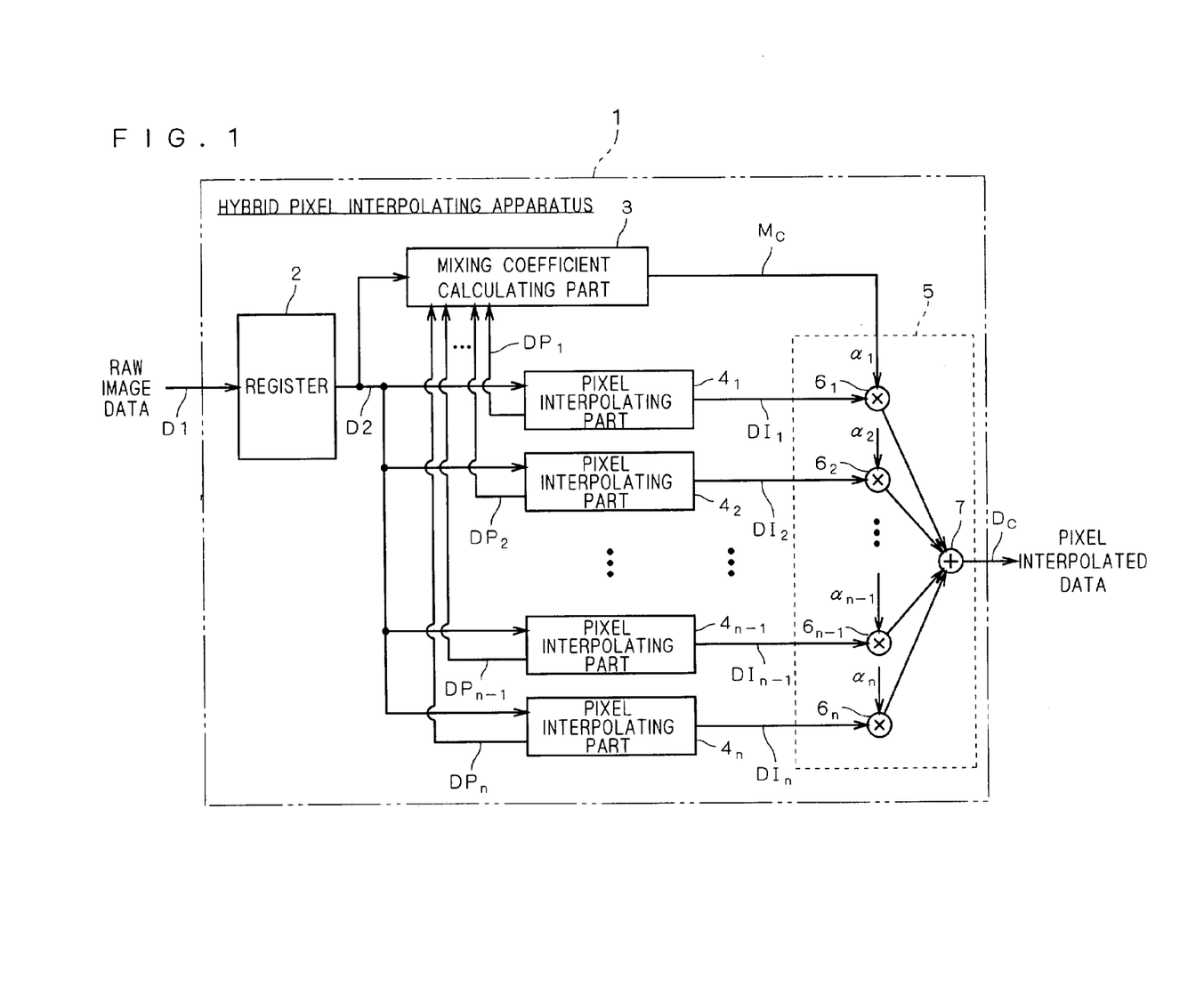
FIG. 1 is a functional block diagram showing a schematic configuration of a hybrid pixel interpolating apparatus according to a first preferred embodiment of the present invention.

FIG. 1 is a functional block diagram showing a schematic configuration of a hybrid pixel interpolating apparatus 1 according to a first preferred embodiment of the present invention. To the hybrid pixel interpolating apparatus 1, raw image data D1 that has been outputted from a single-plate CCD sensor or CMOS sensor and subjected to a signal processing such as A/D conversion is inputted. As described above, in the raw image data D1, each pixel has only one color component.

The hybrid pixel interpolating apparatus 1 comprises a register 2 for holding pixel data within a predetermined pixel region in the inputted raw image data D1; a plurality of pixel interpolating parts $4_1$, $4_2$, ..., $4_{n-1}$, $4_n$ (n: integer not less than 2) for sampling pixel data D2 inputted from the register 2 and performing a pixel interpolating process; a mixing coefficient calculating part 3 for calculating mixing coefficients $\alpha_1, \alpha_2, \ldots, \alpha_n$; and a mixing part 5 for fetching and mixing interpolation data $DI_1, DI_2, \ldots, DI_n$ output from the respective pixel interpolating parts $4_1$ to $4_n$ to output them.

In the first preferred embodiment, the pixel interpolating parts $4_1$ to $4_n$, the mixing coefficient calculating part 3 and the mixing part 5 have hardware configuration, however, the present invention is not limited to this, and at least one functional block among the pixel interpolating parts $4_1$ to $4_n$, the mixing coefficient calculating part 3 and the mixing part 5 may be realized by a software processing.

The resister 2 is configured by, for example, shift registers (not shown) or line memories (not shown) which sequentially hold pixel data of two-dimensional image region such as 3×3 pixels or 5×5 pixels. This resister 2 holds a color component of a center pixel in a two-dimensional image region as a current pixel while distinguishing this current pixel from other pixels. The pixel interpolating parts $4_1$ to $4_n$ have a function of interpolating a color component that is lacking in the current pixel by sampling and using pixel data D2 inputted from the register 2 in different manners.

The mixing coefficient calculating part 3 calculates mixing coefficients $\alpha_1, \alpha_2, \ldots,$ and $\alpha_n$ (coefficient information Mc) to be assigned to the respective pixel interpolating parts $4_1$ to $4_n$ on the basis of the pixel data inputted from the register 2 or data $DP_1, DP_2, \ldots, DP_{n-1}$, and $DP_n$ processed at the pixel interpolating parts $4_1$ to $4_n$ for each pixel. These mixing coefficients $\alpha_1$ to $\alpha_n$ are values that are in proportion to such ratios that the respective pixel interpolating parts $4_1$ to $4_n$ contribute in the entire pixel interpolating process, and the sum total $\alpha_1 + \alpha_2 + \ldots + \alpha_n$ of the mixing coefficients is set at a constant value.

Further, the mixing part 5 has multiplier circuits $6_1$ to $6_n$ for weighting (multiplying) interpolated data $DI_1$ to $DI_n$ inputted from the pixel interpolating parts $4_1$ to $4_n$ by the mixing coefficients $\alpha_1$ to $\alpha_n$ inputted from the mixing coefficient calculating part 3 to output the results, and an adder circuit 7 for adding all the multiplied data outputted from these multiplier circuits $6_1$ to $6_n$ to output the result as pixel interpolation data Dc. To the multiplier circuits $6_1$ to $6_n$, interpolated data $DI_1$ to $DI_n$ is inputted from the pixel interpolating parts $4_1$ to $4_n$, respectively, and the mixing coefficients $\alpha_1$ to $\alpha_n$ corresponding to the respective interpolated data $DI_1$ to $DI_n$ are inputted from the mixing coefficient calculating part 3.

The above mixing coefficient calculating part 3 calculates statistical values (such as sum total, average value, variance and standard deviation) with regard to color components in a local area of such as 3×3 pixels or 5×5 pixels in the vicinity of the current pixel, and analyzes the same to calculate the mixing coefficients $\alpha_1$ to $\alpha_n$ to be respectively assigned to the pixel interpolating parts $4_1$ to $4_n$. As the data used in calculating such statistical values, brightness, hue, saturation, lightness and the like of each color component in that local region can be exemplified. Also, it is possible to calculate the statistical values in the local region after converting the color space (color specification system) of the pixel data D2 into an XYZ color specification system formulated by the International Commission on Illumination, or converting the color components into a chromaticity coordinate system including lightness Y and chromaticity x, y (x, y: values representing hue and saturation).

According to the hybrid pixel interpolating apparatus 1 as described above, interpolated data $DI_1$ to $DI_n$ respectively outputted from the pixel interpolating parts $4_1$ to $4_n$ is then mixed in ratios of the mixing coefficients $\alpha_1$ to $\alpha_n$ assigned by the mixing coefficient calculating part 3. The mixing coefficient calculating part 3 calculates the mixing coefficient $\alpha_1$ to $\alpha_n$ on the basis of the statistical values described above in accordance with the advantage or disadvantage possessed by each of the pixel interpolating parts $4_1$ to $4_n$. Therefore, an optimum pixel interpolating process can be executed in accordance with the characteristics of the image at the local region so that the respective pixel interpolating parts $4_1$ to $4_n$ compensate for their disadvantages one another, or so that the respective pixel interpolating parts $4_1$ to $4_n$ emphasize their advantages one another, and interpolated data $D_c$ of high quality can be obtained.

In the present first preferred embodiment, the pixel interpolating parts $4_1$ to $4_n$ output interpolated data $DI_1$ to $DI_n$ generated by a parallel process, and these interpolated data $DI_1$ to $DI_n$ is simultaneously mixed in the ratios of the mixing coefficients $\alpha_1$ to $\alpha_n$, however in the present invention, it is not necessary to simultaneously mix the interpolated data $DI_1$ to $DI_n$, and the mixing process of the interpolated data $DI_1$ to $DI_n$ can be executed in a plurality of stages. For example, a two-stage process is available wherein after outputting mixed data obtained by mixing output data from two kinds of the pixel interpolating parts, the mixed data is mixed with output data from other pixel interpolating part.

Second Preferred Embodiment

Figure 2:
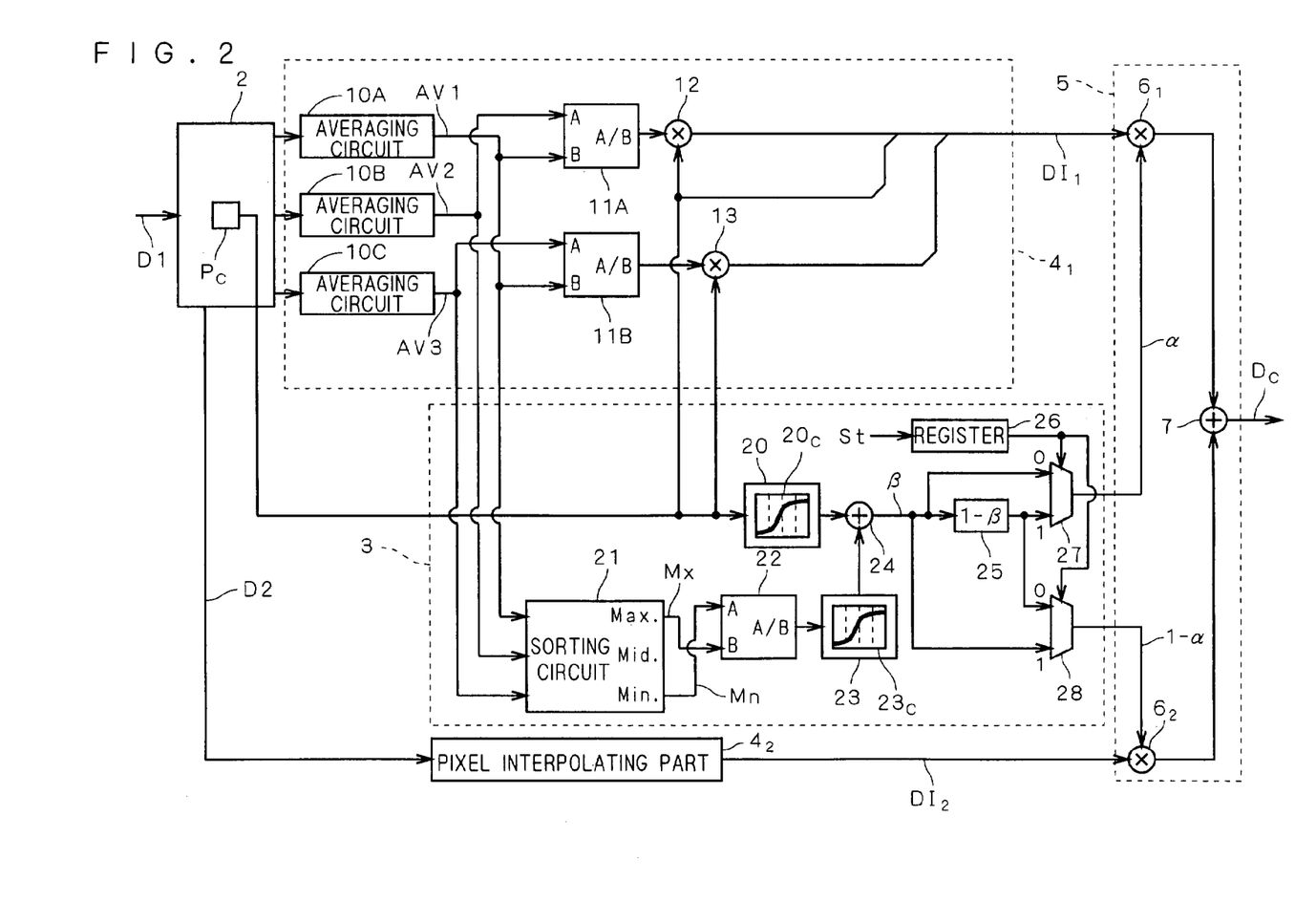
FIG. 2 is a schematic configuration view of a hybrid pixel interpolating apparatus according to a second preferred embodiment of the present invention.

Next, as a concrete example of the hybrid pixel interpolating apparatus 1 according to the first preferred embodiment, a hybrid pixel interpolating apparatus according to the second preferred embodiment and a method thereof will be described. FIG. 2 is a schematic configuration view showing a hybrid pixel interpolating apparatus according to the present preferred embodiment. This hybrid pixel interpolating apparatus comprises a register 2 for holding pixel data of a local region of raw image data D1 inputted from external; pixel interpolating parts $4_1$ and $4_2$ for executing a pixel interpolating processes in different manners; a mixing coefficient calculating part 3 for calculating mixing coefficients $\alpha$ and $1-\alpha$ ($0 \leq \alpha \leq 1$); and a mixing part 5 for mixing interpolated data $DI_1$ and $DI_2$ respectively outputted from the pixel interpolating parts $4_1$ and $4_2$. It is to be noted that the numerical range of mixing coefficient a ($0 \leq \alpha \leq 1$) is represented by a decimal in decimal notation, however the value of "1" which is the upper limitation of mixing coefficient $\alpha$ is actually determined depending on the digital processing system.

Figure 3:
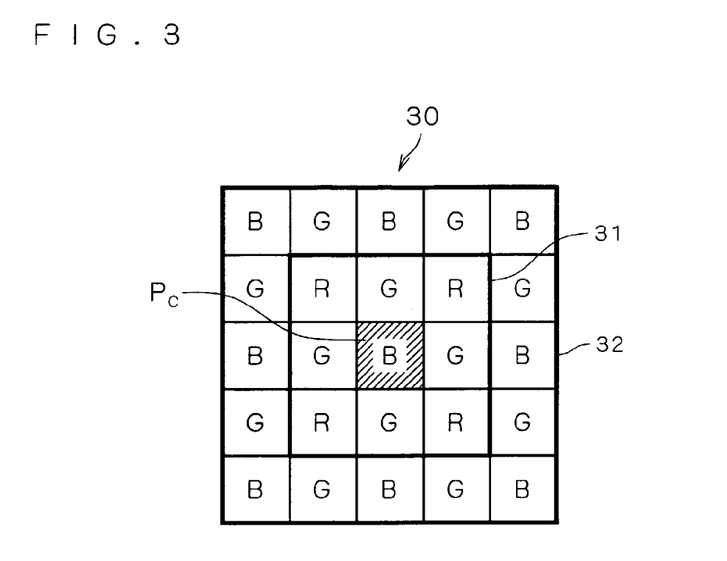
FIG. 3 is a schematic view showing an example of image data of 5×5 pixel region held in a register.

FIG. 3 is a schematic view showing an example of image data 30 of 5×5 pixel region held in the register 2. As shown in the same drawing, the image data 30 is configured in accordance with the color component array shown in FIG. 7, and the hatched center pixel is a current pixel $P_c$. The pixel interpolating parts $4_1$ and $4_2$ shown in FIG. 2 each has a function of sampling pixel data in a local region of the 5×5 pixel region within the bold frame 32 or of the 3×3 pixel region within the bold frame 31 among the pixel regions shown in FIG. 3, to execute a pixel interpolating process.

The pixel interpolating part $4_1$ includes averaging circuits 10A, 10B and 10C for calculating average values (statistical values) AV1, AV2 and AV3 which are obtained by averaging brightness values of R, G, B, . . . in the local region for each color component; divider circuits 11A and 11B; and multiplier circuits 12 and 13. The averaging circuit 10A calculates an average value AV1 of color components which have the same color of the current pixel $P_c$. In the example shown in FIG. 3, as the average value AV1, an arithmetic average value of all B components in the local region is calculated. The other averaging circuits 10B and 10C respectively calculate average values AV2 and AV3 with regard to color components which are lacking in the current pixel $P_c$. In the example shown in FIG. 3, as these average values AV2 and AV3, arithmetic average values of all R components and all G components in the local region are calculated.

To the divider circuit 11A, the average value AV1 regarding the color of the current pixel $P_c$ and the other average value AV2 are inputted, and the divider circuit 11A outputs a ratio (=AV2/AV1) which is obtained by dividing the average value AV2 by the average value AV1 to the multiplier circuit 12. To the other divider circuit 11B, the average value AV1 regarding the color of the current pixel $P_c$ and the other average value AV3 are inputted, and the divider circuit 11B outputs a ratio (=AV3/AV1) which is obtained by dividing the average value AV3 by the average value AV1 to the multiplier circuit 13. The multiplier circuits 12 and 13 respectively multiply the data inputted from the divider circuits 11A and 11B by the pixel data of the current pixel $P_c$ to output the results as components that are lacking in that current pixel $P_c$. Then these color components outputted from the multiplier circuits 12 and 13 are combined on a signal line to be outputted to the mixing part 5 as data $DI_1$.

The contents of the above process in the pixel interpolating part $4_1$ can be mathematically represented as follows. Representing pixel value of the current pixel $P_c$ by "$S_c$", and pixel values of color components that are lacking in the current pixel $P_c$ as "S1" and "S2", the following expressions (1) and (2) can be satisfied.

$$S1 = (AV2/AV1) \times S_c \quad (1)$$

$$S2 = (AV3/AV1) \times S_c \quad (2)$$

As shown in the above expressions (1) and (2), the average values AV1 to AV3 of brightness value in the local region are used at the time of calculating the pixel values S1 and S2, however, in the present invention, without limited to this, when the numbers of pixels in the local region are identical among different colors, sum totals of brightness of different colors in the local region may be used in place of the average values AV1 to AV3 to obtain the same pixel values S1 and S2.

In this way, data of pixels in the vicinity of the current pixel $P_c$ is used in calculating the ratios (AV2/AV1 and AV3/AV1), but not used in an interpolation method using surrounding pixels. In addition, the color components that are lacking in the current pixel $P_c$ are obtained by weighting the pixel value $S_c$ of the current pixel with these ratios. Therefore, a false color will not occur in the image after pixel interpolation, and a moiré where neighboring pixels interfere with each other will not occur, and in addition since high frequency components are not lost, it is possible to represent the lacking color components with high accuracy. In the above description, although explanation was made for the case where the current pixel has a B component, it is apparent that the same interpolation method can be applied in the case where the current pixel has other color components (R component or G component).

Nevertheless the pixel interpolating method implemented by the pixel interpolating part $4_1$ has a drawback that when the SN ratio is poor and noises have mixed into the current pixel $P_c$, the noises are enhanced and perfectly represented. In particular, since noises are easily mixed into low brightness part of the raw image data, when the current pixel $P_c$ has a low brightness part, it is preferred to make the value of the mixing coefficient to be assigned to the pixel interpolating part $4_1$ small.

Furthermore, there is a drawback that colors may change into black and white or that discoloring may be caused in edge portions of colors and in relatively small pixel regions. In order to accurately calculate the lacking color components, at the time of calculating the average values AV1 to AV3 in the local region, a certain degree of signal level is required for each color in the local region, however, when the degree of color deviation is large, an average signal level of a particular color becomes low to cause the discoloring as described above and the color representation deteriorates. In order to prevent the color representation from deteriorating, it is preferred to adjust a value of mixing coefficient to be assigned to the pixel interpolating part $4_1$ larger when the degree of color deviation is small in the local region, and to adjust the value of mixing coefficient smaller when the degree of color deviation is large.

The pixel interpolating part $4_2$ shown in FIG. 2 has a pixel interpolating function on the basis of the bilinear interpolation using surrounding pixels with the use of pixel data D2 inputted from the register 2 and outputs interpolated data $DI_2$ to the mixing part 5. Herein, the pixel interpolating part $4_2$ does not necessarily adopt the bilinear interpolation method, but should have merely a pixel interpolation function that is able to compensate the drawback of the pixel interpolating part $4_1$ as described above.

In the present preferred embodiment, the mixing coefficient calculating part 3 uses values transmitted from the averaging circuits 10A, 10B and 10C of the pixel interpolating part $4_1$, however, in the present invention, averaging circuits for calculating the above average values AV1, AV2 and AV3 may be formed in the mixing coefficient calculating part 3 instead.

Figure 4:
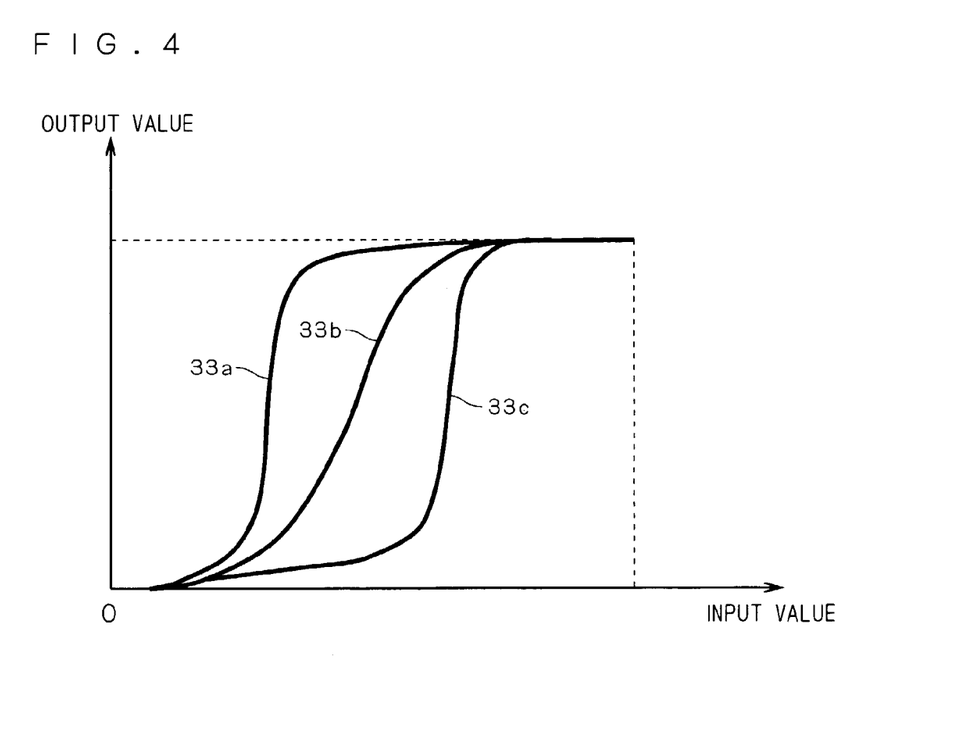
FIG. 4 is a graph showing an example of relation between input value and output value in a first converting circuit.

The mixing coefficient calculating part 3 has a function of calculating the mixing coefficients α and 1−α so as to compensate the drawback associated with the pixel interpolating part $4_1$ described above, or to emphasize the advantage associated with the pixel interpolating part $4_1$. As shown in FIG. 2, the mixing coefficient calculating part 3 has a first converting circuit 20 for converting the pixel value $S_c$ of the current pixel $P_c$ transmitted from the register 2 in accordance with a predetermined conversion table 20c. FIG. 4 is a graph showing an example of relation between input value and output value. In this graph, conversion curves 33a, 33b and 33c representing the functions which uniformly increase in relation to input value are shown, and the conversion table 20c stores sets of output value for input value on such conversion curves 33a to 33c.

The converting circuit 20 as described above converts data of the current pixel $P_c$ inputted from the register 2 in accordance with the conversion table 20c to output the result to the adder circuit 24. The conversion curves 33a to 33c shown in FIG. 4 all have a shape wherein output value is kept low with respect to the input value of low brightness. This is for controlling the influence of noises included in the low brightness part in the raw image data.

The mixing coefficient calculating part 3 further comprises a sorting circuit 21 for outputting the average values AV1, AV2 and AV3 transmitted from the above-mentioned averaging circuits 10A, 10B and 10C while sorting them in an ascending order or in a descending order, a divider circuit 22, and a second converting circuit 23 for converting a pixel value inputted from the divider circuit 22 in accordance with a conversion table 23c. The divider circuit 22 calculates a degree of deviation, which is a value (Mn/Mx) obtained by dividing a minimum value (Mn) by a maximum value (Mn) among the average values AV1, AV2 and AV3 of each color outputted from the sorting circuit 21. By extracting a minimum value and a maximum value and usually dividing the minimum value by the maximum value as described above, it is possible to avoid an occurrence of overflow due to zero value division.

In the present preferred embodiment, as a degree of deviation in color, the ratio between the minimum value and the maximum value among the average values AV1 to AV3 is employed, however, a difference between the minimum value (Mn) and the maximum value (Mx) or an absolute value of the difference may be employed instead.

Figure 5:
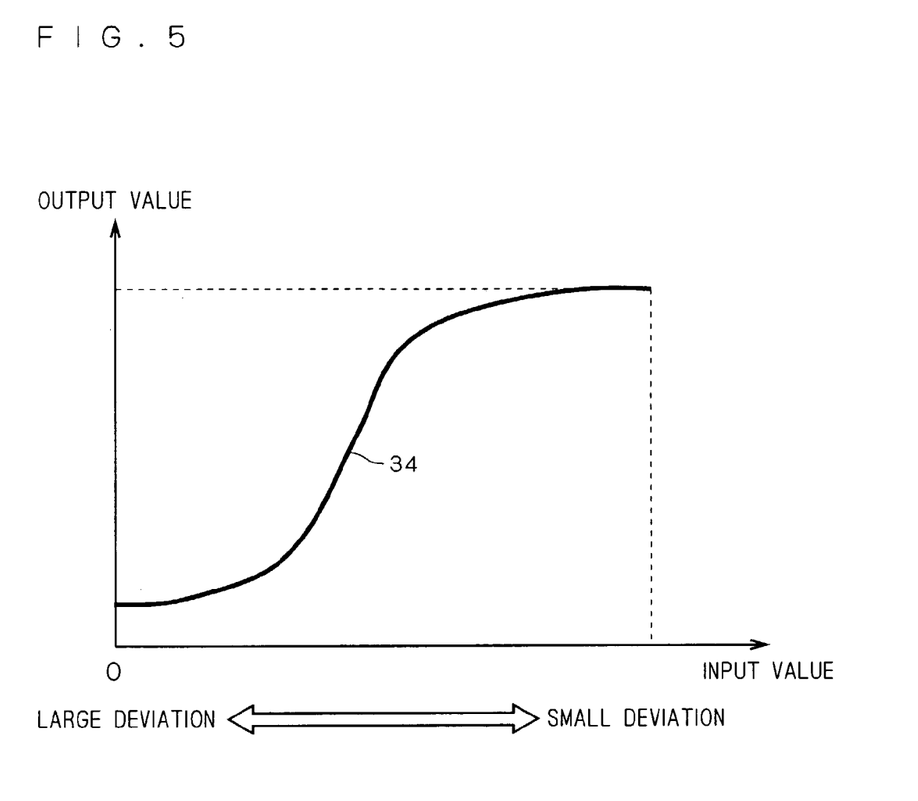
FIG. 5 is a graph showing an example of relation between input value and output value in a second converting circuit.

FIG. 5 is a graph showing an example of relation between input value and output value in the conversion table 23c provided in the second converting circuit 23. Likewise the graph shown in FIG. 4, FIG. 5 shows a conversion curve 34 which represents a function uniformly increasing in relation to input value, and the conversion table 23c stores sets of output value for input value lying on such conversion curve 34. The second converting circuit 23 converts data inputted from the divider circuit 22 in accordance with the conversion table 23c to output the result to the adder circuit 24.

For the above converting circuits 20 and 23, a memory circuit (LUT (lookup table) circuit) which receives address data as input value and outputs memory data corresponding to the address data as output value is suitably used. Alternative to such kind of memory circuit, a simplified operational circuit may be used that has a register capable of storing output values of about 4 points corresponding to input value, and when the actual input value corresponds to the data in the register, outputs that data, and when the actual input value does not correspond to the data in the register, interpolates it using the data of four points stored in the register to output the result.

The division value (Mn/Mx) calculated at the divider circuit 22 is a value indicating a degree of deviation in color in a local region. As shown in FIG. 5, the smaller the division value inputted to the converting circuit 23, the larger the degree of deviation in color, while the larger the division value, the smaller the degree of deviation in color. The converting circuit 23 outputs a value which becomes smaller as the degree of deviation in color increases and larger as the degree of deviation in color decreases in accordance with the graph shown, for example, in FIG. 5.

Then the adder circuit 24 adds values inputted from the first and the second converting circuits 20 and 23 to output internal coefficients β (0≦β≦1) to a subtracter circuit 25, "0" terminal of a first selector 27 and "1" terminal of a second selector 28, respectively. The subtracter circuit 25 outputs to "1" terminal of the first selector 27, a value (=1−β) obtained by subtracting the internal coefficient β from the upper limit value of internal coefficient β.

The first selector 27 selects either "0" terminal or "1" terminal in accordance with whether a logical value of a selection signal St supplied from a register 26 is "0" or "1", and outputs data inputted from the selected terminal to the mixing part 5 as a mixing coefficient α. The register 26 holds the selection signal St transmitted from, for example, a CPU (not shown) and supplies it to the first selector 27 and the second selector 28. A logical value of the selection signal St is set at "0" by default. On the other hand, the second selector 28 selects either "0" terminal or "1" terminal in accordance with whether a logical value of a selection signal St supplied from a register 26 is "0" or "1", and outputs data inputted from the selected terminal to the mixing part 5 as a mixing coefficient 1−α.

To the mixing part 5, mixing coefficients α and 1−α are inputted from the mixing coefficient calculating part 3. In this mixing part 5, the multiplier circuit $6_1$ multiplies interpolated data $DI_1$ inputted from the first pixel interpolating part $4_1$ by the mixing coefficient α to output the result to the adder circuit 7, while the other multiplier circuit $6_2$ multiplies interpolated data $DI_2$ inputted from the second pixel interpolating part $4_2$ by the mixing coefficient 1−α to output the result to the adder circuit 7. Finally the adder circuit 7 adds the data input from the respective multiplier circuits $6_1$ and $6_2$ for each pixel to output the result as pixel interpolated data Dc.

According to the hybrid pixel interpolating apparatus in the second preferred embodiment, the mixing coefficients α and 1−α are calculated on the basis of the brightness value of the current pixel $P_c$ and the ratio (Mn/Mx) between maximum value (Mx) and minimum value (Mn) outputted from the divider circuit 22. Therefore, when the local region of the raw image data includes the characteristics that cause appearance of the above-mentioned drawback associated with the first pixel interpolating part $4_1$ (in large degree of deviation in color and low brightness part including a lot of noises), the value of the mixing coefficient α can be adjusted to small so as to make the contribution of the first pixel interpolating part $4_1$ small and make the contribution of the second pixel interpolating part $4_2$ large. Therefore, it is possible to obtain the pixel interpolated data Dc having high quality by controlling the deterioration in image quality.

In the present preferred embodiment, the ratio between the minimum value and the maximum value among the average values AV1 to AV3 of brightness for each color in the local region is adopted as a degree of deviation in color, however, in the present invention, it is not limited to this ratio, but statistical values such as standard deviation σ and variance $σ^2$ may be calculated so as to use these statistical values for calculating the degree of deviation. In this regard, deviation Δ with respect to certain pixel value $S_x$ in the local region is defined by $Δ=(S_x−K)$ (K: any of AV1 to AV3). At this time, the variance $σ^2$ is an average value of $Δ^2$ in the local region, and the standard deviation σ is a positive square root of the variance $σ^2$.

The converting circuits 20 and 23 convert the pixel value $S_c$ of the current pixel $P_c$ and the ratio (=Mn/Mx) indicating the degree of deviation in color into other values in accordance with the conversion tables 20c and 23c. Therefore, by adjusting the conversion curves of the respective conversion tables 20c and 23c, it is possible to optimize the mixing coefficients α and 1−α to control the deterioration in image quality as small as possible. In addition, when the converting circuits 20 and 23 have a plurality of conversion tables which can be switched at liberty, by switching the conversion table in correspondence with the plural situations, it is possible to optimize the mixing coefficients α and 1−α.

Concretely, the situation where the present hybrid pixel interpolating apparatus is incorporated into a digital camera supporting a plurality of imaging modes can be assumed. As the imaging modes, "landscape imaging mode", "portrait imaging mode", "close up mode", "night imaging mode" and the like can be exemplified, and for each imaging mode, an optimum conversion table can be selected.

Furthermore, since the hybrid pixel interpolating apparatus according to the present preferred embodiment has the selectors 27 and 28 for outputting the internal coefficients β and 1−β which can be interchanged in accordance with the logical value of the selection signal St of the register 26, it is possible to calculate the mixing coefficients α and 1−α which flexibly follow the situation by designating the logical value of the selection signal St from external. For example, when the hybrid pixel interpolating apparatus is incorporated into a digital camera which supports a plurality of imaging modes, it is possible to designate the logical value of the selection signal St so that the deterioration in image quality is small in accordance with each imaging mode as described above on the basis of the judgment at a CPU or the like.

In the first preferred embodiment, the internal coefficient β is calculated by using the adder circuit 24 for adding output values of the converting circuits 20 and 23, however, instead of the adder circuit 24, an equality determination circuit which determines equality between these output values and selects and outputs either a larger output value or a smaller output value may be used. In the case where such an equality determination circuit is used, since either one of the converted value of the brightness value of the current pixel (output value of the converting circuit 20) and the converted value of the degree of deviation in color (output value of the converting circuit 23) can be used in preference to the other, it is possible to prevent both of the converting circuits 20 and 23 from outputting converted values of intermediate levels to cause the internal coefficient β to be easily saturated in the vicinity of the upper limit value.

Modified Example of First Preferred Embodiment

Figure 6:
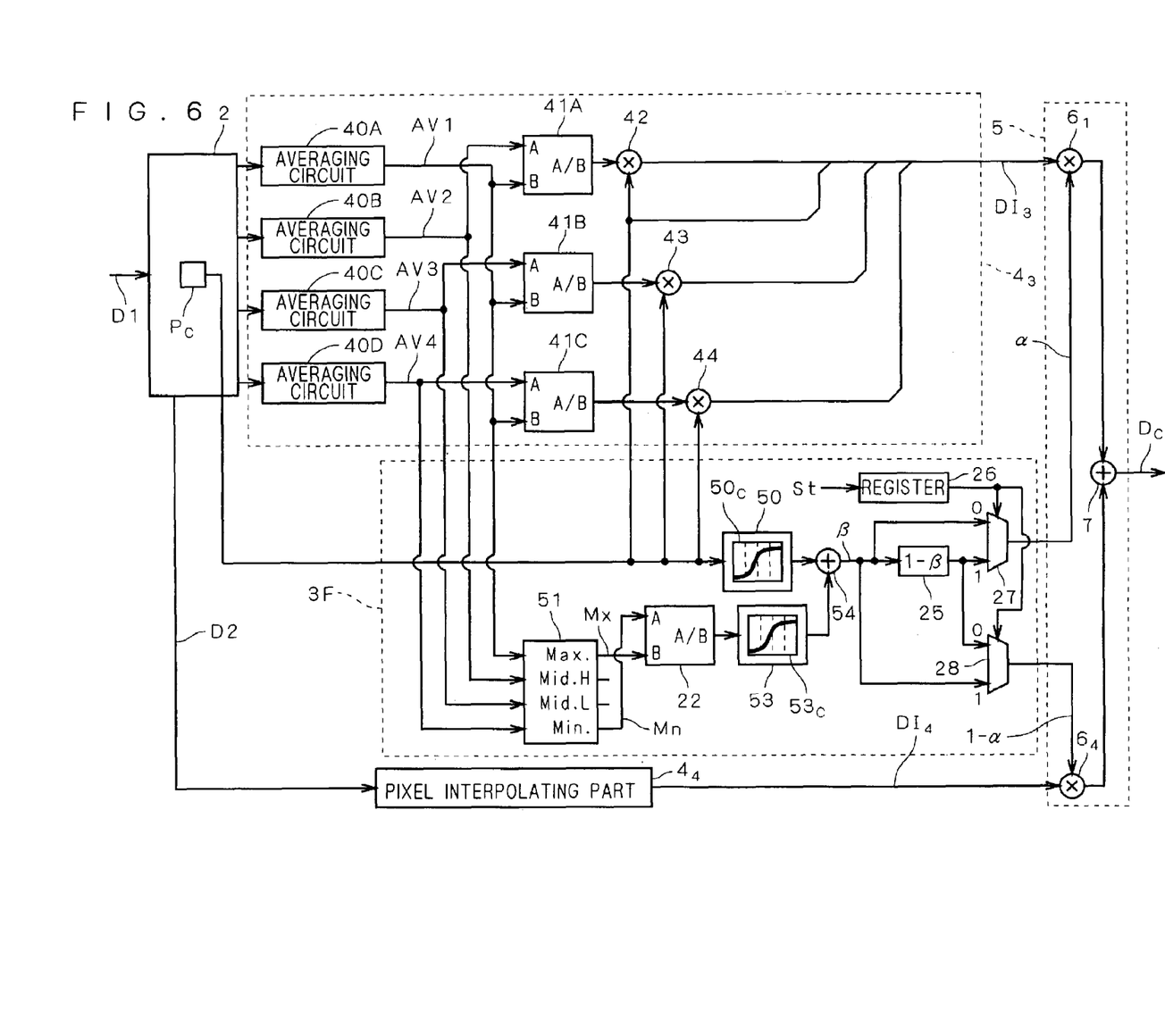
FIG. 6 is a schematic configuration view of a hybrid pixel interpolating apparatus according to a modified example of the first preferred embodiment.

FIG. 6 is a schematic configuration view showing a hybrid pixel interpolating apparatus according to a modified example of the first preferred embodiment as described above. The hybrid pixel interpolating apparatus according to the present modified example can deal with raw image data D1 which is picked up by a single-plate image pickup sensor having a color filter array of complementary color system, and has a basic configuration which is identical to that of the hybrid pixel interpolating apparatus shown in FIG. 2. In FIG. 6, the constituents denoted by the same reference numerals in FIG. 2 are considered as having the same functions as those of the constituents as described above, and the detailed description thereof will be omitted.

This hybrid pixel interpolating apparatus comprises a register 2 for holding pixel data in a local region of raw image data D1 having four kinds of complementary color components as shown in FIG. 8, two kinds of pixel interpolating parts $4_3$ and $4_4$ for sampling pixel data D2 inputted from the register 2 to perform a pixel interpolation process, a mixing coefficient calculating part 3F for calculating mixing coefficients α and 1−α ($0≦α≦1$), and a mixing part 5 for mixing interpolated data $DI_3$ and $DI_4$ respectively outputted from the pixel interpolating parts $4_3$ and $4_4$.

The first pixel interpolating part $4_3$ has approximately the same function as the pixel interpolating part $4_1$ shown in FIG. 2. The second pixel interpolating part $4_4$ has a pixel interpolation processing function which compensates the drawback associated with the first pixel interpolating part $4_3$. The first pixel interpolating part $4_3$ includes averaging circuits 40A, 40B, 40C and 40D for calculating average values (statistical values) AV1, AV2, AV3 and AV3 by averaging four kinds of complementary color components in the local region for each color; divider circuits 41A, 41B and 41C; and multiplier circuits 42, 43 and 44. The averaging circuit 40A among the averaging circuits 40A to 40D calculates the average value AV1 regarding a complementary color component of a current pixel $P_c$. And the divider circuits 41A, 41B and 41C respectively output values obtained by dividing the average values AV2, AV3 and AV4 by the average value AV1 of the current pixel $P_c$ to the multiplier circuits 42, 43 and 44. Then the multiplier circuits 42, 43 and 44 calculate pixel values S1, S2 and S3 of complementary color components that are lacking in the current pixel $P_c$ in accordance with the following expressions (3), (4) and (5), and output these pixel values to the mixing part 5 as interpolated data $DI_3$ after bundling them on a signal line.

$$S1 = (AV2/AV1) \times S_c \quad (3)$$

$$S2 = (AV3/AV1) \times S_c \quad (4)$$

$$S3 = (AV4/AV1) \times S_c \quad (5)$$

On the other hand, the mixing coefficient calculating part 3F has approximately the same function as the mixing coefficient calculating part 3 shown in FIG. 2. That is, in this mixing coefficient calculating part 3F, likewise the converting circuit 20 shown in FIG. 2, a converting circuit 50 converts a brightness value of the current pixel $P_c$ in accordance with an internal conversion table $50c$ to output the result. A sorting circuit 51 outputs the average values AV1 to AV4 inputted from the pixel interpolating part $4_3$ while sorting them in an ascending order or a descending order, and the divider circuit 22 calculates a ratio (Mn/Mx) between maximum value (Mx) and minimum value (Mn) of the average values AV1 to AV4 inputted from the sorting circuit 51, and then a converting circuit 53 converts the ratio inputted from the divider circuit 22 in accordance with an internal conversion table $53c$ to output the result in the same manner as is in the converting circuit 23 shown in FIG. 2.

Additionally, an adder circuit 54 adds data inputted from the converting circuit 50 and data inputted from the converting circuit 53 to output the result as an internal coefficient β, and the subtracter circuit 25 outputs a value (=1−β) obtained by subtracting the internal coefficient β from the upper limit value of internal coefficient β (=1). Then the selectors 27 and 28 select the internal coefficients β and 1−β in accordance with a logical value of a selection signal St supplied from the register 26, and outputs them as the mixing coefficients α and 1−α to the mixing part 5.

Finally, the mixing part 5 adds a value obtained by multiplying the interpolated data $DI_3$ inputted from the pixel interpolating part $4_3$ by the mixing coefficient α and a value obtained by multiplying the interpolated data $DI_4$ inputted from the pixel interpolating part $4_4$ by the mixing coefficient 1−α to output the result as pixel interpolated data Dc.

While the invention has been described in detail, the foregoing description is in all aspects illustrative and not restrictive. It is understood that numerous other modifications and variations can be devised without departing from the scope of the invention.

What is claimed is:

1. A hybrid pixel interpolating apparatus which converts raw image data having only one color component for each pixel into pixel interpolated data having a plurality of color components for each pixel, comprising:

a plurality of pixel interpolating parts for interpolating color components lacking at a current pixel in different manners using color components in surrounding pixels of the current pixel in said raw image data;

a mixing coefficient calculating part for calculating mixing coefficients assigned to each of said pixel interpolating parts using the color components in a local region in the vicinity of the current pixel in said raw image data, and data processed at each of said plurality of pixel interpolating parts; and a mixing part for generating said pixel interpolated data by mixing interpolated data inputted from said plurality of pixel interpolating parts for each pixel in accordance with said mixing coefficients.

2. The hybrid pixel interpolating apparatus according to claim 1, wherein said mixing coefficient calculating part comprises a circuit for calculating each of said mixing coefficients on the basis of a signal level of said current pixel.

3. The hybrid pixel interpolating apparatus according to claim 2, wherein said mixing coefficient calculating part comprises a converting circuit for converting the signal level of said current pixel in accordance with a predetermined conversion table, and calculates each of said mixing coefficients on the basis of a value converted at the converting circuit.

4. The hybrid pixel interpolating apparatus according to claim 1, wherein said mixing coefficient calculating part comprises a circuit for calculating each of said mixing coefficients on the basis of a statistical value regarding said color component in said local region.

5. The hybrid pixel interpolating apparatus according to claim 4, wherein said statistical value is a sum total or an average value of brightness values for each color in said local region.

6. The hybrid pixel interpolating apparatus according to claim 4, wherein said statistical value is a standard deviation or a variance for each color of said color components in said local region.

7. The hybrid pixel interpolating apparatus according to claim 4, wherein said mixing coefficient calculating part comprises a circuit for calculating a degree of deviation in color of said local region by using said statistical values, and calculating said mixing coefficients in accordance with the degree of deviation.

8. The hybrid pixel interpolating apparatus according to claim 7, wherein said degree of deviation is a difference between said statistical values of different colors.

9. The hybrid pixel interpolating apparatus according to claim 4 or 7, wherein said mixing coefficient calculating part has a converting circuit for converting said statistical value or value of said degree of deviation in accordance with a predetermined conversion table, and calculates each of said mixing coefficients on the basis of a value converted at the converting circuit.

10. The hybrid pixel interpolating apparatus according to claim 1, wherein said mixing coefficient calculating part comprises a circuit for interchanging said mixing coefficients in accordance with an externally inputted control signal.

11. The hybrid pixel interpolating apparatus according to claim 1, wherein
said raw image data results from picking up by a single-plate image pickup device mounted on a digital camera.

12. A hybrid pixel interpolating apparatus which converts raw image data having only one color component for each pixel into pixel interpolated data having a plurality of color components for each pixel, comprising:
a plurality of pixel interpolating parts for interpolating color components lacking at a current pixel in different manners using color components in surrounding pixels of the current pixel in said raw image data;
a mixing coefficient calculating part for calculating mixing coefficients assigned to each of said pixel interpolating parts using the color components in a local region in the vicinity of the current pixel in said raw image data; and
a mixing part for generating said pixel interpolated data by mixing interpolated data inputted from said plurality of pixel interpolating parts for each pixel in accordance with said mixing coefficients wherein
said mixing coefficient calculating part comprises a circuit for calculating each of said mixing coefficients on the basis of a statistical value regarding said color component in said local region,
said mixing coefficient calculating part comprises a circuit for calculating a degree of deviation in color of said local region by using said statistical values, and calculating said mixing coefficients in accordance with the degree of deviation, and
said degree of deviation is a ratio between said statistical values of different colors.

13. The hybrid pixel interpolating apparatus according to claim 12, wherein
said ratio is a ratio between maximum value and minimum value in said statistic values.

14. A hybrid pixel interpolating apparatus which converts raw image data having only one color component for each pixel into pixel interpolated data having a plurality of color components for each pixel, comprising:
a plurality of pixel interpolating parts for interpolating color components lacking at a current pixel in different manners using color components in surrounding pixels of the current pixel in said raw image data;
a mixing coefficient calculating part for calculating mixing coefficients assigned to each of said pixel interpolating parts using the color components in a local region in the vicinity of the current pixel in said raw image data; and
a mixing part for generating said pixel interpolated data by mixing interpolated data inputted from said plurality of pixel interpolating parts for each pixel in accordance with said mixing coefficients, wherein
at least one pixel interpolating part among said plurality of pixel interpolating parts comprises:
a circuit for calculating ratios for each color between an average value or a sum total of color components which have the same color of the current pixel in said local region and an average value or a sum total of color components lacking in the current pixel; and
a circuit for generating said lacking color components by multiplying the color component of said current pixel by said ratios.

15. A hybrid pixel interpolating method which converts raw image data having only one color component for each pixel into pixel interpolated data having a plurality of color components for each pixel, comprising the steps of:
(a) interpolating color components lacking at a current pixel by a plurality of pixel interpolating processes each of which is different from each other using color components in surrounding pixels of the current pixel in said raw image data;
(b) calculating mixing coefficients assigned to each of said pixel interpolating processes using the color components in a local region in the vicinity of the current pixel in said raw image data, and data generated by said each of said pixel interpolating processes; and
(c) generating said pixel interpolated data by mixing interpolated data interpolated in each of said pixel interpolating processes in said step (a) for each pixel in accordance with said mixing coefficients.

16. The hybrid pixel interpolating method according to claim 15, wherein
said step (b) comprises a step of calculating each of said mixing coefficients on the basis of a signal level of said current pixel.

17. The hybrid pixel interpolating method according to claim 16, wherein
said step (b) comprises a converting step of converting a signal level of said current pixel in accordance with a predetermined conversion table, and comprises a step of calculating each of said mixing coefficients on the basis of a value converted in said converting step.

18. The hybrid pixel interpolating method according to claim 15, wherein
said step (b) comprises a step of calculating each of said mixing coefficients on the basis of a statistical value regarding said color component in said local region.

19. The hybrid pixel interpolating method according to claim 18, wherein
said statistical value is a sum total or an average value of brightness values for each color in said local region.

20. The hybrid pixel interpolating method according to claim 18, wherein
said statistical value is a standard deviation or a variance for each color of said color components in said local region.

21. The hybrid pixel interpolating method according to claim 18, wherein
said step (b) comprises a step of calculating a degree of deviation in color of said local region by using said statistical values, and calculating each of said mixing coefficients in accordance with the degree of deviation.

22. The hybrid pixel interpolating method according to claim 21, wherein
said degree of deviation is a difference between said statistical values of different colors.

23. The hybrid pixel interpolating method according to claim 18 or 21, wherein
said step (b) comprises a converting step of converting said statistical value or value of said degree of deviation in accordance with a predetermined conversion table, and a step of calculating each of said mixing coefficients on the basis of a value converted in said converting step.

24. The hybrid pixel interpolating method according to claim 15, further comprising the step of:
(d) interchanging said mixing coefficients calculated in said step (b) in accordance with an externally inputted control signal.

25. The hybrid pixel interpolating method according to claim 15, wherein
said raw image data results from picking up by a single-plate image pickup device mounted on a digital camera.

26. A hybrid pixel interpolating method which converts raw image data having only one color component for each pixel into pixel interpolated data having a plurality of color components for each pixel, comprising the steps of:
(a) interpolating color components lacking at a current pixel by a plurality of pixel interpolating processes each of which is different from each other using color components in surrounding pixels of the current pixel in said raw image data;
(b) calculating mixing coefficients assigned to each of said pixel interpolating processes using the color components in a local region in the vicinity of the current pixel in said raw image data; and
(c) generating said pixel interpolated data by mixing interpolated data interpolated in each of said pixel interpolating processes in said step (a) for each pixel in accordance with said mixing coefficients wherein
said step (b) comprises a step of calculating each of said mixing coefficients on the basis of a statistical value regarding said color component in said local region,
said step (b) comprises a step of calculating a degree of deviation in color of said local region by using said statistical values, and calculating each of said mixing coefficients in accordance with the degree of deviation, and
said degree of deviation is a ratio between said statistical values of different colors.

27. The hybrid pixel interpolating method according to claim 26, wherein
said ratio is a ratio between maximum value and minimum value in said statistic values.

28. A hybrid pixel interpolating method which converts raw image data having only one color component for each pixel into pixel interpolated data having a plurality of color components for each pixel, comprising the steps of:
(a) interpolating color components lacking at a current pixel by a plurality of pixel interpolating processes each of which is different from each other using color components in surrounding pixels of the current pixel in said raw image data;
(b) calculating mixing coefficients assigned to each of said pixel interpolating processes using the color components in a local region in the vicinity of the current pixel in said raw image data; and
(c) generating said pixel interpolated data by mixing interpolated data interpolated in each of said pixel interpolating processes in said step (a) for each pixel in accordance with said mixing coefficients, wherein
at least one pixel interpolating process among said plural pixel interpolating processes in said step (a) has:
(a-1) a process of calculating ratios for each color between an average value or a sum total of color components which have the same color of the current pixel in said local region and an average value or a sum total of color components lacking in the current pixel; and
(a-2) a process of generating said lacking color components by multiplying the color component of said current pixel by said ratios calculated in said process (a-1).

* * * * *